(12) United States Patent
D'Addetta et al.

(10) Patent No.: US 10,493,935 B2
(45) Date of Patent: Dec. 3, 2019

(54) METHOD FOR CONTROLLING AN OCCUPANT PROTECTION SYSTEM OF A VEHICLE, AND CONTROL DEVICE

(71) Applicant: Robert Bosch GmbH, Stuttgart (DE)

(72) Inventors: Gian Antonio D'Addetta, Stuttgart (DE); Heiko Freienstein, Weil der Stadt (DE); Henning Hoepfner, Renningen (DE); Josef Kolatschek, Weil der Stadt (DE)

( * ) Notice: Subject to any disclaimer, the term of this patent is extended or adjusted under 35 U.S.C. 154(b) by 161 days.

(21) Appl. No.: 15/699,171

(22) Filed: Sep. 8, 2017

(65) Prior Publication Data

US 2018/0065580 A1    Mar. 8, 2018

(30) Foreign Application Priority Data

Sep. 8, 2016 (DE) .......................... 10 2016 217 105

(51) Int. Cl.
*B60R 21/0132* (2006.01)
*B60R 21/015* (2006.01)
*B60R 21/01* (2006.01)

(52) U.S. Cl.
CPC .... *B60R 21/0132* (2013.01); *B60R 21/01516* (2014.10); *B60R 21/01542* (2014.10); *B60R 21/01552* (2014.10); *B60R 2021/01013* (2013.01); *B60R 2021/01034* (2013.01); *B60R 2021/01286* (2013.01)

(58) Field of Classification Search
CPC .......... B60R 21/0132; B60R 21/01516; B60R 21/01542; B60R 21/01552

USPC .......................................................... 701/45
See application file for complete search history.

(56) References Cited

U.S. PATENT DOCUMENTS

| | | | | |
|---|---|---|---|---|
| 2003/0201659 A1* | 10/2003 | Yasuda | ................ | B60N 2/4228 297/216.13 |
| 2006/0097496 A1* | 5/2006 | Theisen | .............. | B60R 21/0132 280/735 |
| 2006/0192367 A1* | 8/2006 | Zumpano | ............... | B60N 2/286 280/730.1 |
| 2006/0208169 A1* | 9/2006 | Breed | .................... | B60N 2/002 250/221 |
| 2008/0243342 A1* | 10/2008 | Breed | ................. | B60R 21/0132 701/45 |
| 2009/0222171 A1* | 9/2009 | Jabusch | .................. | B60R 19/36 701/45 |
| 2012/0089303 A1* | 4/2012 | Freienstein | .......... | B60N 2/0276 701/45 |
| 2014/0018974 A1* | 1/2014 | Okita | .................... | B60W 30/20 701/1 |

(Continued)

*Primary Examiner* — Yazan A Soofi
(74) *Attorney, Agent, or Firm* — Norton Rose Fulbright US LLP; Gerard Messina (57) ABSTRACT

A method for controlling an occupant protection system of a vehicle includes reading in at least one vehicle acceleration value representing an acceleration of the vehicle and at least one model parameter of an occupant model by which a vehicle occupant is represented by at least two, in particular three, mass points. The vehicle acceleration value and the model parameter are processed in order to determine at least one motion parameter relating to the two, in particular three, mass points. Using the motion parameter, a control signal for controlling the occupant protection system is produced.

14 Claims, 8 Drawing Sheets

(56) References Cited

U.S. PATENT DOCUMENTS

2017/0232929 A1\* 8/2017 McGovern .......... B64D 11/062
297/411.1

\* cited by examiner

METHOD FOR CONTROLLING AN OCCUPANT PROTECTION SYSTEM OF A VEHICLE, AND CONTROL DEVICE

CROSS-REFERENCE TO RELATED APPLICATIONS

The present application claims priority under 35 U.S.C. § 119 to DE 10 2016 217 105.4, filed in the Federal Republic of Germany on Sep. 8, 2016, the content of which is hereby incorporated by reference herein in its entirety.

FIELD OF THE INVENTION

The present invention relates to control of a vehicle occupant protection system.

BACKGROUND

Since the introduction of the legal requirement to wear the safety belt in 1977, as well as the introduction of the safety belt in the 1970s and of the airbag in the 1980s, the number of fatalities has been significantly reduced, from 21,000 per year to 3,500 per year. In addition to other restraint systems, the safety belt is responsible for almost 75 to 80% of the restraining action for the vehicle occupants in the case of an accident. A further development in this area was the introduction of systems having irreversible safety belt tensioners in the mid-1980s. In recent years, work has been done on systems that are designed to prevent accidents and to reduce the severity of accidents. In this connection, systems have been developed that range from interior compartment sensing to so-called pre-crash recognition systems.

In order to couple the occupants as early as possible to the vehicle deceleration in the case of an accident, for example excess belt looseness, caused for example by thick clothing or considerations of comfort, can be remedied by pyrotechnic tensioning after the beginning of the collision. Recently, reversible mechanical actuators have been used as belt tensioners, which can be activated in a critical driving situation or through environmental sensing, and which can very effectively remedy excess belt looseness, because they come into play before the collision. If a collision nonetheless takes place, then for example the pyrotechnic belt tensioning can in addition be activated. In this way, a still earlier coupling of the occupants can be ensured.

The targeted coupling of the passengers to a vehicle deceleration can cause very strong loads on the passengers, predominantly in the head and thorax regions. These loading peaks can be reduced for example by belt force limiters. The design here is based on the release of the safety belt starting from a specified safety belt force, for example starting from a force level in the range of from 2 to 3 kN. In general, the limitation of force can take place through mechanical energy conversion designs, for example destruction, for example via tear seams on the safety belt or tear plates, through deformation, for example through torsion bars in the belt roller, in some cases also having a multi-stage realization, or through friction, for example through multiple disk brakes. The intention is to ensure that, given a belt force that remains constant, the energy consumption takes place through increasing forward displacement of the occupants; i.e., a front airbag takes over the occupants from the belt system beginning from a particular point in time, for example after 40 to 60 ms. During the collision, the kinetic energy of the occupants should be distributed as advantageously as possible among the components of the occupant protection system and the interior compartment. Systems in use today reduce the belt force for example via a mechanical system, based on a coupled torsion rod, or via a wedge brake.

SUMMARY

Against this background, an approach presented here provides a method for controlling an occupant protection system of the vehicle, as well as a control device that uses this method, as well as a corresponding computer program.

According to an example embodiment, a method for controlling an occupant protection system of a vehicle includes: reading in at least one vehicle acceleration value that represents an acceleration of the vehicle and at least one model parameter of an occupant model, through which an occupant of the vehicle is represented by at least two, in particular three, mass points; processing of the vehicle acceleration value and of the model parameter in order to determine at least one motion parameter related to the two, in particular three, mass points; and producing a control signal for controlling the occupant protection system using the motion parameter.

An occupant protection system can be understood as a system made up of a plurality of reversible or irreversible restraint components for protecting an occupant during a collision of the vehicle. A restraint component can be understood for example as a safety belt, an airbag, a belt tensioner, or a seat. A vehicle acceleration value can be understood as a measured vehicle acceleration value. Alternatively to the measured vehicle acceleration value, a predicted acceleration value can also be used for predictions. This predicted value can be determined either on the basis of previous acceleration values or on the basis of environmental sensors (radar, video, lidar, etc.), on the basis of a foreseeable accident. An occupant model can be understood as a simplified calculation model for modeling an actual motion of the occupant during the collision. For example, the occupant model can be a spring-damper model through which the two, in particular three, mass points can be linked with one another taking into account particular spring or damping constants. The occupant model can for example be formed as a differential equation model in order to describe a respective motion of the two, in particular three, mass points in three-dimensional space. A model parameter can be understood for example as a parameter representing the occupant, such as a mass, a size, or an age of the occupant, or some other quantity characterizing the occupant.

For example, the model parameter can represent a respective mass of the two, or three, mass points, or a respective position of the two or three mass points relative to one another or relative to a common coordinate system. The position of the two or three mass points can for example be defined by a length of imaginary connecting lines between the two or three mass points, or an angle between the imaginary connecting lines. Alternatively or in addition, the model parameter can be a parameter of a seat, a belt, such as a belt length or belt force, an airbag, such as a filling pressure or a volume of the airbag, an armature, or a steering wheel of the vehicle. The model parameter can be vehicle-specific or component-specific, and can for example be provided ahead of time by the respective manufacturer. In this way, the model parameter can for example be determined once ahead of time, so that an ascertaining of the model parameter during operation of the vehicle can be omitted. In order to determine the model parameter, for example data ascertained in crash tests can be used. Alternatively or in addition, the model parameter can be ascertained, checked, or adapted using at least one sensor of the vehicle, such as an environmental sensor, an interior compartment sensor, a seat position switch, or a pressure sensor of the airbag, in particular for example during a collision, in order to make it possible to take into account an actual course of the collision when controlling the occupant protection system.

The two or three mass points can for example each be assigned to a different body part of the occupant, for example a head and neck region, an upper body, and a lower body of the occupant. A motion parameter can for example be understood as a respective acceleration, a respective speed, or a respective path of the two, in particular three, mass points.

The approach presented here is based on the recognition that using an occupant model that models an occupant of the vehicle, or components of an occupant protection system of the vehicle, as a model made up of at least two, in particular three, mass points assigned to the occupant, a motion of the occupant during a collision of the vehicle can be ascertained quickly and reliably on the basis of a modeled movement of the two, in particular three, mass points with a relatively low computing outlay. As a function thereof, restraint components of the vehicle can be optimally controlled.

The approach described here makes it possible to efficiently and precisely describe complex world scenarios of an accident event, and, building thereon, to achieve the greatest possible protective effect for vehicle occupants during real accidents. Previous approaches have focused in particular on particular cases of load, which can be tested through crash tests, such as Euro NCAP, US NCAP, FMVSS208, or AZT. Due to their low number, these crash tests are not by themselves capable of supplying an adequate description of the real accident event. Through complex occupant models, it is possible to achieve an optimal protective effect in the areas that deviate from the clearly defined load cases of the crash tests.

Here, in a region around the clearly defined load cases of the crash tests, the controlling can first conventionally take place according to predefined rules, while a model-based interpolation takes place only in load cases that deviate strongly. In a final expansion stage, for example in each case the controlling of the restraint component(s) takes place without special processing of the crash test load cases. For these cases as well, on the basis of the occupant model an optimal controlling should then be found.

In contrast, the approach presented here makes it possible, on the basis of a complex occupant model, to describe the forces acting on the occupant and the resulting motion and kinematics. From this there results the advantage of a reliable positional determination of the occupant at all times during an accident, as well as a reliable controlling of restraint component(s) present in the vehicle based on this determination of position. Advantageously, an occupant model such as the subject matter of the approach described here can be adapted to a vehicle interior compartment using few parameters, while the internal kinematics of the occupant is independent of the vehicle.

Very simple models are not able to adequately describe the occupant motion during an accident, because the occupant motion deviates greatly from the motion of a free-flying mass. The determination of the occupant position using interior compartment sensors, for example an interior camera or using ultrasound sensors, can very quickly run up against its limits, because, given a standard accident duration of approximately 100 ms, an interior compartment camera can provide only three images at the standard image rate. The repetition rate of standard ultrasound sensors is in a similar range.

Thus, in general the interior compartment sensor system is too slow to follow the motion of the occupant during the accident, but for example can be very well-suited to determine the initial conditions for the occupant model.

Using the approach presented here, the gap can be closed between very simple models, such as free mass models, and very complex numerical models, such as models based on the finite elements method or a multi-body dynamics, in which the simulation of a single accident can take from several hours to a few days. For example, a reference implementation of the approach presented here in MATLAB permits a calculation on standard PCs within a few milliseconds, so that an adequately fast calculation is possible even on control devices having low computing power.

Approaches are known according to which either a forward displacement of a free-flying mass is determined on the basis of the second integral, or more precise information about the occupant position is ascertained using interior compartment sensing systems. Because the second integral for a free-flying mass does not, however, precisely reproduce the state of the occupant, because the belt system, the airbag, and the internal mechanical structure of the occupant are not taken into account, larger errors can occur during the calculation of the forward displacement. Such errors can be avoided using the approach presented here. In addition, the approach presented here offers the advantage that interior compartment sensing during a crash can be dispensed with.

A higher-order advantage of the approach presented here is the increase of occupant safety during a vehicle collision both in the reduction of occupant loading, and thus the severity of injury, even in cases in which a collision can no longer be prevented and a pre-crash phase with occupant motion is definitely present. In addition, the approach described here enables a precise estimation of the occupant position in the crash phase, for which for example imaging methods are less suitable, for technical and cost reasons. A further advantage is the easy adaptability to different occupant characteristics, such as mass, size, proportion, sex, or age. In this way, the approach presented here can be well applied. In addition, the approach described here makes it possible to continuously correct a prediction result, for example by feeding in current measurement values during an accident, such as of an acceleration or of a crash impulse, so that errors can be reduced in comparison to purely predictive models. The approach presented here additionally permits a calibrated triggering of various restraint systems, and thus the deployment of the full effectiveness of all present actuators not only for standard crash cases but in particular also for real accident scenarios. Depending on the specific embodiment, the approach presented here makes it possible to react to changing external circumstances even after the triggering of the restraint systems, such as the deployment of an airbag, and if necessary to adapt the state of the restraint systems. In this way, the loading on the vehicle occupants in these cases can often be reduced in comparison to a conventional system. The occupant model, as the subject matter of the approach presented here, additionally enables a post-crash estimation of the occupant through which information usable for a secondary crash can be provided, or enables the provision of a driver for individual occupant safety, also referred to as IOS, or of an enabler and motivator for adaptive restraint systems such as an adaptive airbag, an electromotoric retractor, or an adaptive belt force limiter. In addition, the occupant model can be used to provide information to the occupant, for example for signaling a safe zone in the case of partly or fully automatic driving functions.

According to a specific embodiment, in the step of reading in, a parameter can be read in as the model parameter that can be assigned to a head mass point representing a head and/or neck of the occupant, to an upper body mass point representing an upper body of the occupant, to a lower body mass point representing a lower body of the occupant, or to a combination of at least two of the named mass points. Correspondingly, in the step of processing the vehicle acceleration value and the model parameter can be processed in order to determine a parameter relating to the head mass point, the upper body mass point, or the lower body mass point as the motion parameter. In this way, the motion of individual body parts of the occupant can be modeled.

The method can in addition include a step of determining at least one restraining force acting on the occupant, using the vehicle acceleration value or, in addition or alternatively, the model parameter. Here, in the step of processing the motion parameter can be determined taking into account the restraining force. A restraining force can be understood as a force that counteracts a motion of the occupant caused by a deceleration of the vehicle. For example, the restraining force can be exerted on the occupant by a belt, a seat, or an airbag. Through this specific embodiment, the motion of the occupant can be ascertained in a manner particularly close to reality.

According to a further specific embodiment, in the step of determining, the restraining force can be determined relating to at least one of the three mass points. In this way, a simple, fast, and reliable ascertaining of the restraining force is enabled.

It is advantageous if, in the step of determining, a force exerted on the occupant by a belt, a seat, or an airbag of the vehicle, or by a combination of at least two of the named components of the occupant protection system, is determined as the restraining force. In addition or alternatively, in the step of determining, a neck force of the occupant can be determined as the restraining force. In this way, the determination of the restraining force can take place on the basis of model parameters that are easy to provide.

In addition, the method can include a step of comparing the restraining force to a reference force. In the step of producing, the control signal can be produced as a function of a result of the comparison. The reference force can for example be a maximum or minimum restraining force. Depending on the result of the comparison, the control signal can for example be produced in order to increase or to reduce the restraining force by controlling a corresponding restraint component of the occupant protection system. Through this specific embodiment, the restraining force can be modified in a targeted fashion.

In addition, in the step of producing the control signal can be produced in order to increase a length of the belt by unrolling the belt if the comparison yields the result that the restraining force is greater than the reference force. In this way, injuries to the occupant due to a too-tightly tensioned safety belt can be prevented.

According to a further specific embodiment, in the step of reading in, an item of environmental information representing a surrounding environment of the vehicle, or, in addition or alternatively, an item of interior compartment information representing an interior compartment of the vehicle can be read in. An item of environmental information can be understood as an item of information provided by an environmental sensor such as a camera, or an ultrasound, infrared, or laser sensor of the vehicle. An item of interior compartment information can for example be understood as an item of information relating to the occupant, a seat position, a seat occupancy, or a belt status. The item of interior compartment information can be provided by a corresponding interior compartment sensor system of the vehicle. Correspondingly, in the step of processing, the motion parameter can be determined using the environmental information or the interior compartment information, or both items of information. Through this specific embodiment, the motion parameter can be ascertained in a manner particularly close to reality. For example, in this way the motion parameter can be continuously adapted to an actual course of the collision. In this way, the safety of the occupant can be further increased through corresponding controlling of the occupant protection system.

This method can be implemented for example in software or hardware, or in a mixed form of software and hardware, for example in a control device.

In addition, the approach presented here provides a control device that is fashioned to carry out, control, or realize the steps of a variant of a method presented here in corresponding devices. Through this variant embodiment of the present invention in the form of a control device as well, the object of the present invention can be achieved quickly and efficiently.

For this purpose, the control device can have at least one computing unit for processing signals or data, at least one storage unit for storing signals or data, at least one interface to a sensor or to an actuator for reading in sensor signals from the sensor or for outputting control signals to the actuator, and/or at least one communication interface for reading in or outputting data that are embedded in a communication protocol. The computing unit can for example be a signal processor, a microcontroller, or the like, and the storage unit can be a flash memory, an EPROM, or a magnetic storage unit. The communication interface can be fashioned to read in or output data wirelessly and/or in line-bound fashion, a communication interface capable of reading in or outputting the line-bound data being capable of reading in these data for example electrically or optically from a corresponding data transmission line, or of outputting them electrically or optically to a corresponding data transmission line.

In the present context, a control device can be understood as an electrical device that processes sensor signals and outputs control signals and/or data signals as a function thereof. The control device can have an interface that can be fashioned as hardware and/or as software. In the case of a realization as hardware, the interfaces can for example be part of a so-called system ASIC that contains a wide variety of functions of the control device. However, it is also possible for the interfaces to be separate integrated circuits, or to be made up at least partly of discrete components. In the case of a realization as software, the interfaces can be software modules present for example on a microcontroller alongside other software modules.

In an advantageous embodiment, the control device carries out a controlling of the vehicle. For this purpose, the control device can for example access sensor signals such as acceleration signals, pressure signals, steering angle signals, or environmental sensor signals. The controlling takes place via actuators such as brake or steering actuators, or an engine control device of the vehicle.

Also advantageous is a computer program product or computer program having program code that can be stored on a machine-readable carrier or storage medium such as a semiconductor memory, a hard disk memory, or an optical memory, and can be used to carry out, realize, and/or control the steps of the method according to one of the specific embodiments described above, in particular when the program product or program is executed on a computer or on a device.

Exemplary embodiments of the present invention are shown in the drawings and are explained in more detail in the following description, in which identical or similar reference characters are used for elements shown in the various figures that have similar function, and a repeated description of those elements is omitted.

DETAILED DESCRIPTION

Figure 1:
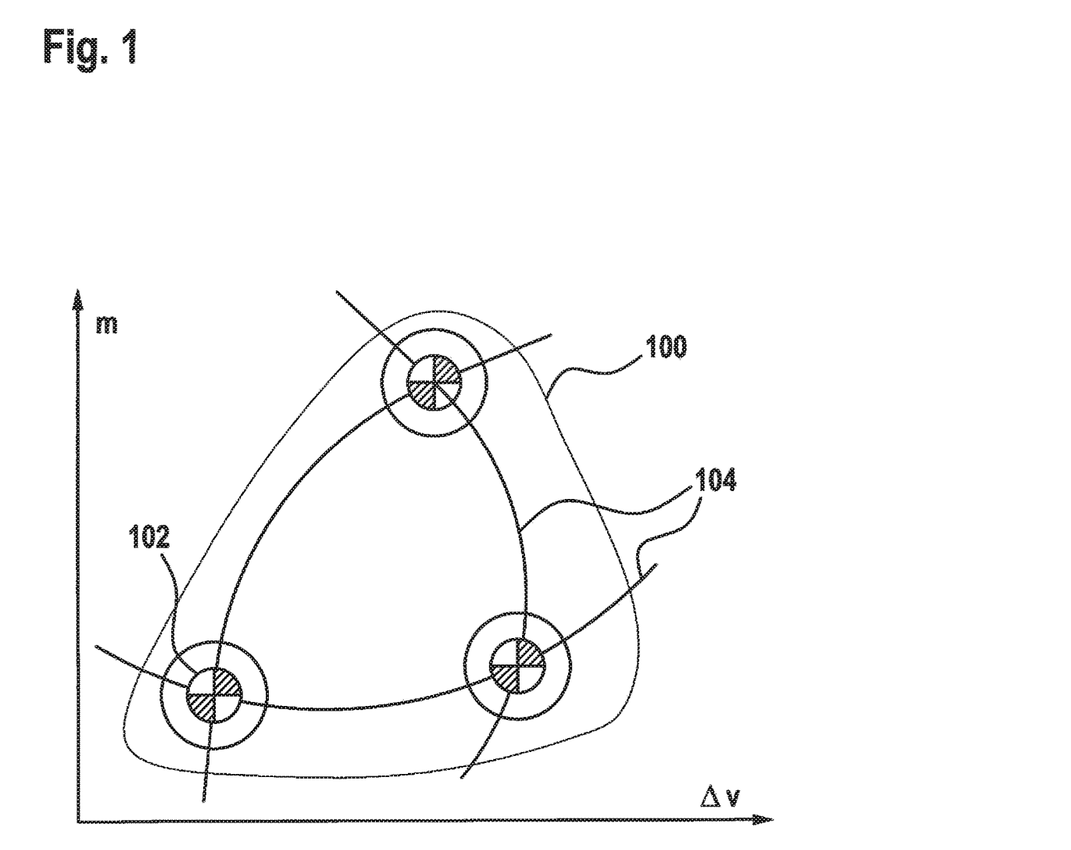
FIG. 1 shows a diagram schematically representing a real accident event as a function of a mass and a change of speed of a vehicle.

FIG. 1 shows a diagram for the schematic representation of a real accident event as a function of a mass m and a change in speed $\Delta v$ of a vehicle. Shown is an accident event of a real, complex world 100, modeled through queried crash tests 102, such as NCAP tests, with associated interpolation curves 104 that are used to describe scenarios through a corresponding model.

Figure 2:
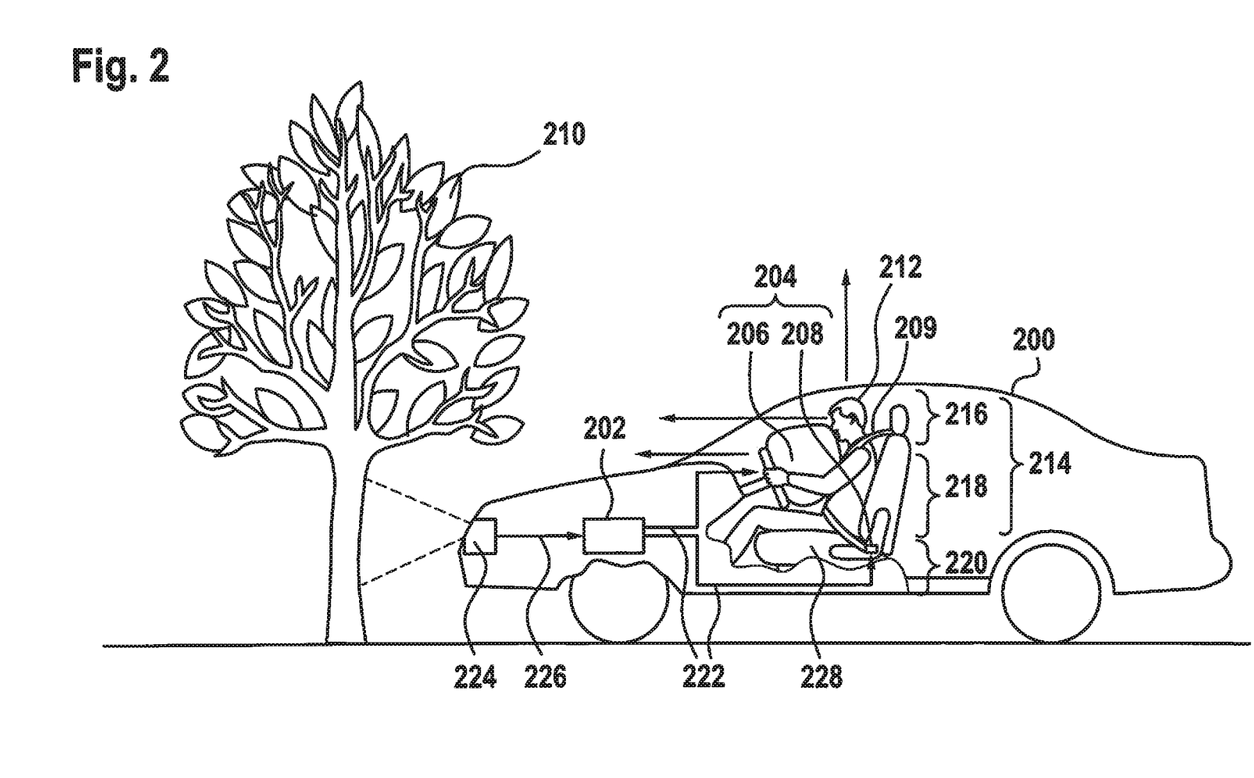
FIG. 2 shows a schematic representation of a vehicle having a control device according to an example embodiment of the present invention.

FIG. 2 shows a schematic representation of a vehicle 200 having a control device 202 according to an exemplary embodiment. Control device 202 is fashioned to control an occupant protection system 204 of vehicle 200.

As an example, occupant protection system 204 includes an airbag 206 and a belt force limiter 208 for limiting a belt force acting on a belt 209. Vehicle 200 is about to collide with an object 210, here a tree. In order to control occupant protection system 204, control device 202 ascertains a motion of an occupant 212 of vehicle 200, caused by the collision of vehicle 200, using an occupant model 214 and a current acceleration of the vehicle 200, which in the scenario shown in FIG. 2 is a deceleration of vehicle 200. For example, occupant 212 is represented in occupant model 214 by at least two, here in particular three, mass points linked to one another, here by a head mass point 216 assigned to a head region of occupant 212, an upper body mass point 218 assigned to an upper body of occupant 212, and a lower body mass point 220 assigned to a lower body of occupant 212. Control device 202 uses the current acceleration of vehicle 200 and suitable parameters of occupant model 214, also called model parameters hereinafter, to model the motion of occupant 212 on the basis of a motion of the two, in particular three, mass points 216, 218, 220. Examples of directions of motion of the two, in particular three, mass points 216, 218, 220 are schematically illustrated by four arrows. The model parameters are for example ascertained through crash trials and are stored in control device 202. In addition, the model parameters can be adapted to an actual course of an accident via measurements by sensors of vehicle 200. As a function of the motion of occupant 212 ascertained on the basis of occupant model 214, control device 202 produces control signals 222 for controlling the components of occupant protection system 204, here airbag 206 and belt force limiter 208. In this way, occupant protection system 204 can be controlled with a low computing outlay, and thus particularly quickly.

Optionally, control device 202 is connected to an environmental sensor 224 for acquiring a surrounding environment of vehicle 200, in order to read in an item of environmental information 226 that is provided by environmental sensor 224 and that represents object 210. According to this exemplary embodiment, control device 202 is fashioned to ascertain the motion of the two, in particular three, mass points 216, 218, 220, additionally using item of environmental information 226.

According to an exemplary embodiment, control device 202 ascertains the respective motions of the two, in particular three, mass points 216, 218, 220, taking into account at least one restraining force exerted on occupant 212 by occupant protection system 204. The restraining force is exerted for example by airbag 206, belt 209, or a seat 228 occupied by occupant 212. Control device 202 ascertains the restraining force in particular using the model parameter. For example, control device 202 is fashioned to activate belt force limiter 208 when the restraining force exceeds a specified reference force.

Figure 3:
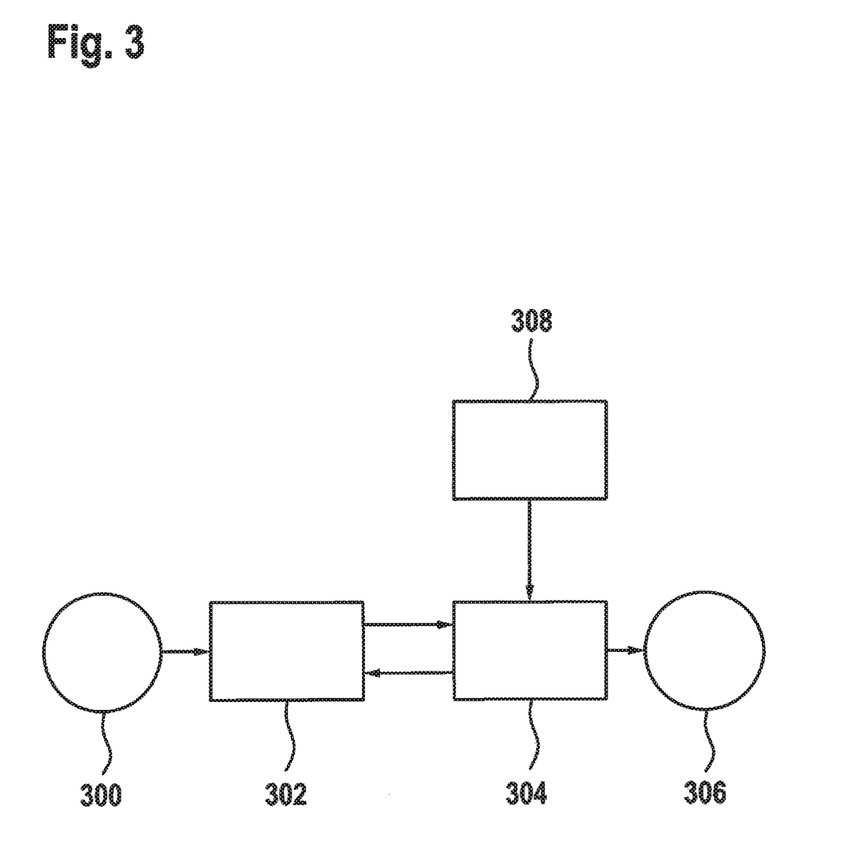
FIG. 3 shows a representation of an overall schema of an occupant protection system for controlling by a control device according to an example embodiment of the present invention.

FIG. 3 shows a representation of an overall schema of an occupant protection system 204 for controlling by a control device 202 according to an exemplary embodiment, such as a control device, as described above on the basis of FIG. 2. Shown are a block 300, representing an item of occupant information, a block 302 that represents the occupant model, a block 304 that represents an actuator controlling, a block 306 that represents a restraint controlling strategy, and a block 308 that represents an energy management. The directions of a signal flow between the individual blocks are marked with arrows.

The occupant protection function is represented by an overall system made up of a higher-level controlling instance that enables the use of particular restraint components, for example in groups, on the basis of external conditions, and the combination of the occupant model and actuator controlling, which determine an optimal triggering strategy in a process that is in particular iterative, and including occupant parameters that are present.

The occupant model is designed for example as a differential equation model that, depending on the exemplary embodiment, is solved analytically or as a numerically calculated occupant simulation. The occupant model represents a three-dimensional model that describes the complete motion of the occupant in space.

Figure 4:
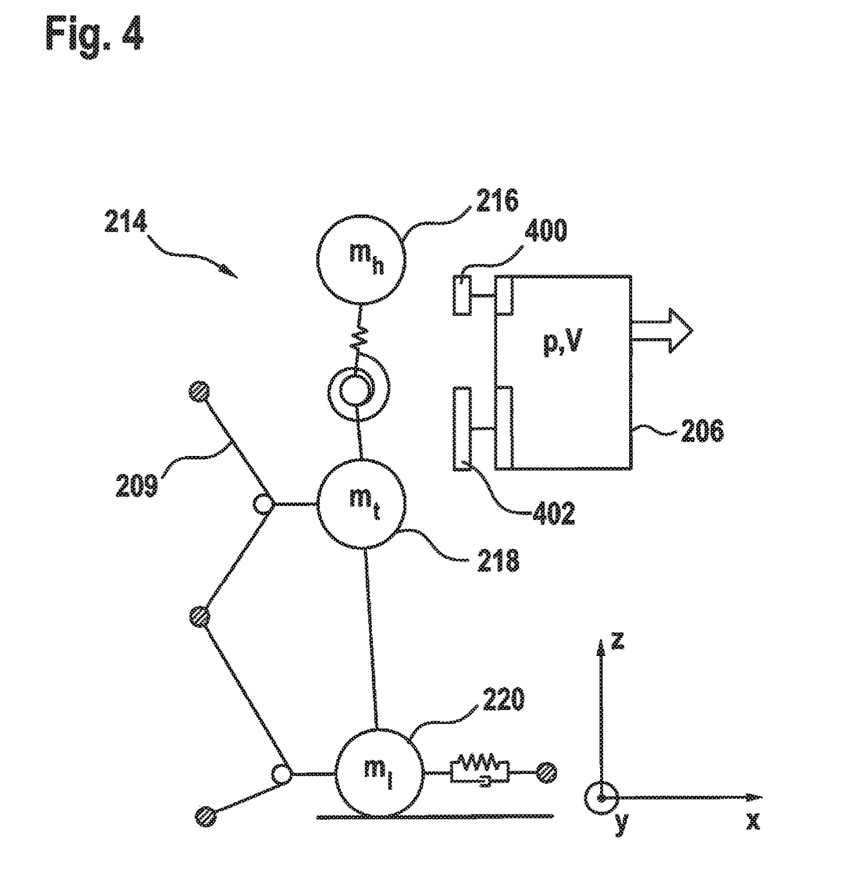
FIG. 4 shows a schematic representation of an occupant model for ascertaining of an occupant motion by a control device according to an example embodiment of the present invention.

FIG. 4 shows a schematic representation of an occupant model 214 for the ascertaining of an occupant motion by a control device according to an exemplary embodiment, for example a control device described above on the basis of FIGS. 2 and 3.

According to this exemplary embodiment, occupant model 214 is fashioned as a spring-mass-damper model for representing the motion of the occupant in the case of an accident. Here, for example the focus is on a frontal accident. Occupant model 214 includes the two, in particular three, mass points 216, 218, 220, having masses $m_h$, $m_t$, and $m_l$. Here, lower body mass point 220 represents the lower body up to the pelvis, upper body mass point 218 represents the upper body including the arms, and head mass point 216 represents the head of the occupant. These are point masses that are connected to one another via spring-damper elements. The connection between the pelvis and the upper body (thorax) is here realized so as to be fixed in length but capable of rotation. In the model, the pelvis moves only one-dimensionally in the x direction, here corresponding to a direction of travel of the vehicle. Motions in the z direction (vertical axis) and y direction (transverse direction) are not possible. The upper body is connected to the pelvis and is realized as a standing pendulum; that is, the connection is rigid but capable of rotation. The length of this connection corresponds for example to the distance of the upper body center of gravity from the pelvis in a human being, as is known from the literature.

The two mass points 218, 220 are in addition coupled to the elastic belt 209. Also shown is airbag 206 having a gas volume V and a gas pressure p. The two quantities V, p are influenced by two plungers 400, 402 that act on airbag 206, a first plunger 400 representing a contact surface of the head with airbag 206 and a second plunger 402 representing a contact surface of the upper body with airbag 206. A direction of release of airbag 206 is identified by an arrow.

The shoulder point is also situated on the axis from the pelvis to the upper body center of gravity, but at a greater distance from the pelvis. This distance is also known from the literature.

At the shoulder point, the upper body is connected to the head. The connecting element of the shoulder point to the mass center of gravity of the head is realized as a combined spring-damper element and as a torsion spring; that is, a change in length and a change of angle are possible, but are reset by internal forces. To ascertain the values of the neck rigidity, for example the spring constants of a Hybrid III dummy are used, as is used in crash tests for modeling human beings.

Figure 5:
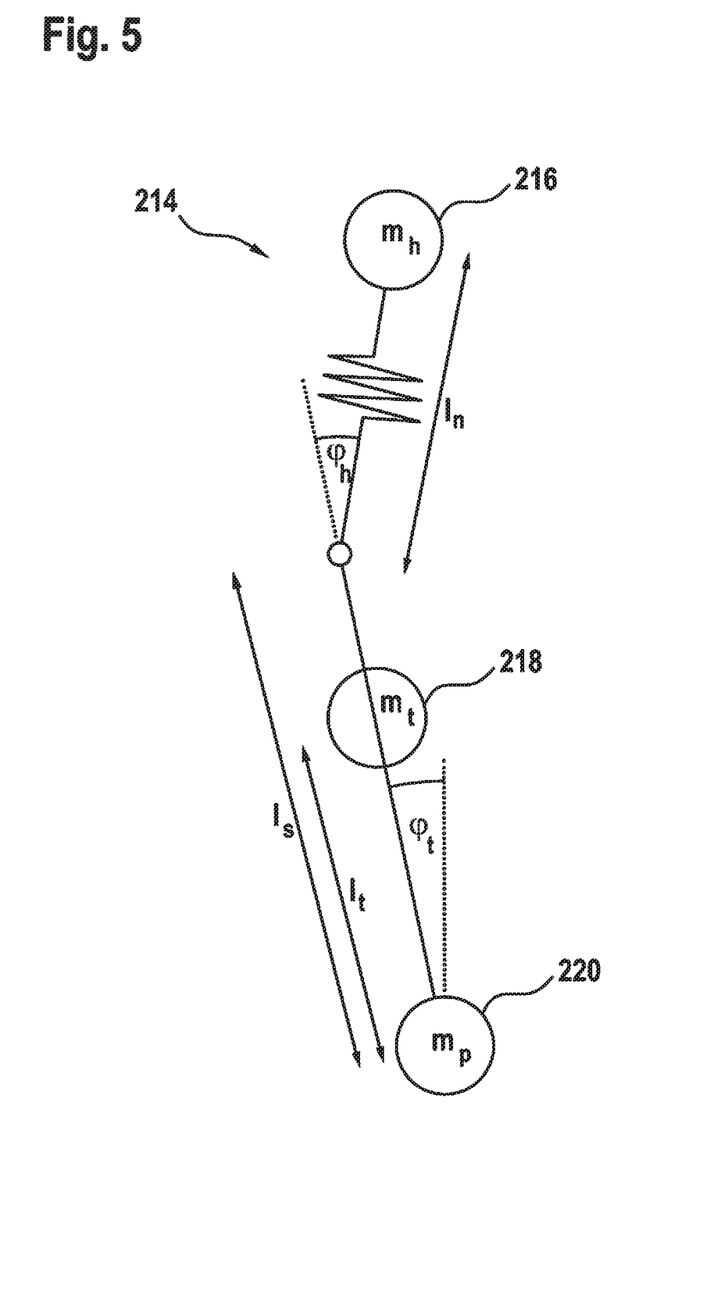
FIG. 5 shows a schematic representation of occupant elements of an occupant model for ascertaining of an occupant motion by a control device according to an example embodiment of the present invention.

FIG. 5 shows a schematic representation of occupant elements of an occupant model 214 for the ascertaining of a motion of an occupant by a control device according to an exemplary embodiment. Occupant model 214 essentially corresponds to an occupant model as shown in FIG. 4. In FIG. 5, in addition various model parameters of occupant model 214 are depicted, as are used in the motion equations described below in order to ascertain the occupant motion.

The input quantity for the calculation using occupant model 214 is for example a crash impulse, indicated in sampled form. The crash impulse is for example handed over in one piece so that the simulation is calculated completely and immediately. Alternatively, the data points are each handed over to occupant model 214 directly after a measurement in the vehicle, and the corresponding current occupant motion is calculated therefrom. In each case, the time points $t_k$ are known, as are the vehicle acceleration values $a_{Fz}(k)$ with the associated time values $t(k)$, which increase strictly monotonically with k. Thus, the smallest time step that can be represented is $dt(k)=t(k)-t(k-1)$. In addition, $1 \leq k \leq K$, where k, $K \in N$.

Starting with the vehicle acceleration values, first the vehicle motion is calculated. For this purpose, the vehicle acceleration values are summed and an integration constant is selected such that the final speed goes to zero, thus:

$$v_{Fz}(k) = \sum_{i=1}^{k} a_{Fz}(l) - v_{Fz}(K).$$

Through further summation, the vehicle position is determined therefrom:

$$s_{Fz}(k) = \sum_{i=1}^{k} v_{Fz}(l) - s_{Fz}(K).$$

Here as well, the integration constant is selected such that the final position is $$s_{Fz}(K)=0.$$

Depending on the exemplary embodiment, the crash impulse is indicated explicitly or is determined generically. Here, an initial speed is dismantled via a sinusoidal deceleration impulse. The deceleration is $$a_{Fz}(k) = \begin{cases} a_{max} \cdot \frac{1}{2}\left(1 - \cos 2\pi \frac{t}{\tau}\right) \\ 0 \end{cases}$$

with the maximum deceleration being $$a_{max} = 2\frac{v_0}{\tau}$$

and the pulse duration τ. For typical cases of load, i.e., initial speeds in the range of around 50 km/h, the pulse duration is for example in the range of approximately 120 ms.

For description, the occupant is analyzed into two, in particular three, elements. The two, in particular three, elements are the pelvis and legs, the upper body including the arms, and the head. These elements are modeled by the point masses $m_p$ for the legs, $m_t$ for the upper body, and $m_h$ for the head, these being connected to one another. Here, the connection between the pelvis and the upper body is rigid, while the connection between the upper body and the head is realized via a spring that can be expanded and compressed.

As an example, in the following the occupant model 214 is described in simplified fashion as a two-dimensional model that is resolved numerically step-by-step.

The positive x axis points in the direction of travel, while the positive z axis points upward. Lateral movements inside the vehicle are not taken into account.

For the simulation, a common coordinate system is used in which at the beginning the pelvis $m_p$ is situated at the origin. In addition, the pelvis can move only in the x direction; movement in the z direction is not possible. The position on the x axis is $x_p$. For the upper body $m_t$, only the angle $\varphi_t$ is used for the description, due to the necessary condition resulting from the rigid connection with the pelvis. If absolute coordinates are required, these can be determined as $$x_t = x_p + l_t \sin \varphi_t$$

and $$z_t = l_t \cos \varphi_t.$$

The head is described by the free coordinates $x_h$ and $z_h$, the connection to the upper body being held by the spring element.

During a crash, the vehicle acceleration acts on all occupant elements. The restraint systems here ensure that the occupant does not leave the vehicle. In particular, here the seat, the safety belt, and the airbag are to be taken into consideration.

The pelvis is connected to the seat with a non-positive connection, and in addition is held in position by the belt. The acceleration acting on the pelvis is therefore $$a_p(k) = a_{Fz}(k) + \frac{F_{p,g}(k-1) + F_{p,s}(k-1)}{m_p}$$

and can be converted into pelvis speed and pelvis position by summation two times, i.e.

$$v_p(k) = v_p(k-1) + a_p(k) \cdot dt(k)$$

and $$x_p(k) = s_p(k-1) + v_p(k) \cdot dt(k)$$

For the upper body, first the moment of inertia $J_t = m_t \cdot l_t^2$ is to be calculated from the mass $m_t$ and the lever arm $l_t$. The following then holds for the occurrent angular acceleration:

$$\alpha_t(k) = \frac{a_{Fz}(k) \cdot \cos \varphi_t(k-1)}{l_t} + \frac{M_{t,g}(k-1) + M_{t,b}(k-1) + M_{t,n}(k-1)}{J_t}$$

with the applied torques $M_{t,g}$ by the belt, $M_{t,b}$ by the airbag, and $M_{t,n}$ by the neck, if the angle enclosed between the neck and the upper body does not disappear. From this, through summation two times the angular speed results as $$\omega_t(k) = \omega_t(k-1) + \alpha_t(k) \cdot dt(k)$$

and the angle results as $$\varphi_t(k) = \varphi_t(k-1) + \omega_t(k) \cdot dt(k)$$

For the head, all position calculations are to be carried out in two dimensions. Here, the airbag force $F_{h,b}$ and the neck force $F_{h,n}$, each having different angles of attack, act on the head. For the neck force, the position of the neck in space is required. It is calculated as $$\varphi_{n,g} = \arctan(x_h - x_t, z_h - z_t)$$

with the inverse tangent function over four quadrants of arctan. From the neck length $$l_n = \sqrt{(x_h - x_t)^2 + (z_h - z_t)^2}$$

the spring force of the neck results as $$|\vec{F}_n(k)| = [l_n(k) - l_n(0)] \cdot k_{f,n}$$

with the spring constant $k_{f,n}$. This is decomposed into x and z components. The following holds:

$$\vec{F}_n = |\vec{F}_n| \cdot \begin{pmatrix} \frac{x_h - x_t}{l_n} \\ \frac{z_h - z_t}{l_n} \end{pmatrix}.$$

With the neck force, the torque exerted on the upper body can also be determined. Here the following holds:

$$M_{t,n} = |\vec{F}_n| \cdot l_t \cdot \sin \varphi_k,$$

because the effective lever arm is a function of the angle between the upper body and the neck.

As an alternative to this description of the neck as a rotational spring that permits rotation on a circular path as well as change of the radius of the circular path, a description as a flexible beam is also possible. In this way, the trajectory in which only a torque and no axial force is transmitted is changed from a circular path to a modified path.

In addition, the head is restrained by the airbag, so that the overall acceleration of the head, in a vectorial representation, results as $$\vec{a_k}(k) = a_{Fz}(k) \cdot \vec{e_x} + \frac{\vec{F_n}(k-1) + \vec{F_{h,b}}(k-1)}{m_h}$$

with unit vector $\vec{e_x}$ in the x direction. Through summation, the head speed results as $$\vec{v_h}(k) = \vec{v_k}(k-1) + \vec{a_h}(k) \cdot dt(k)$$

and, through repeated summation, there results the head position $$\vec{x_h}(k) = \vec{x_h}(k-1) + \vec{v_h}(k) \cdot dt(k)$$

also in a vectorial representation. These give the equations of motion for the occupants in the vehicle without any restraint systems.

In the simplest case, the safety belt is described as an extensible band whose spring constant is a function of the effective length. At first, friction is neglected, so that the belt force of the lap belt and shoulder belt are first assumed to be equal. However, in this case only the tension force of the belt is equal. The effective restraining force is however not necessarily identical, because in general the belt geometry is different.

The initial belt length is determined from the geometry of the belt system. Here, both in the upper body region and in the pelvic region an initial length is provided in the x and z directions, and during a crash the belt is then extended in the x direction.

Here, at each time the belt length is $$l_g = \sqrt{(x_t + x_{t0})^2 + z_{t0}^2} + \sqrt{(x_p + x_{p0})^2 + z_{p0}^2},$$

with positions $x_t$ of the upper body and $x_p$ of the pelvis. The extension of the belt is then $$\varepsilon(k) = \frac{l_g(k)}{l_g(0)}$$

and is dimensionless, for which reason the following then holds for the belt force:

$$F_g = k_{f,g} \cdot \varepsilon$$

with constant of elasticity $k_{f,g}$, having the dimension of a force. The belt force is then converted into the effectively acting restraining forces for the upper body and the pelvis, taking into account the geometric relations. Here the force on the pelvis is $$F_{p,g} = F_g \cdot \frac{x_p}{l_g}$$

and the force on the upper body is $$F_{t,g} = F_g \cdot \frac{x_t}{l_g}$$

and from these there results the acting torque $$M_{t,g} = F_{t,g} \cdot l_t$$

under the assumption that the belt force is applied at the mass center of gravity of the upper body.

As an expansion of the belt, for example a belt force limiter is modeled that limits the effective belt force to a maximum value. For this purpose, if the force becomes greater than the maximum provided belt force, the initial length of the belt is increased in order to reduce the extension and thus the effective force. The belt force is then equal to the maximum force and the amount of belt paid out is $$l_{PO} = \frac{l_g(k)}{F_{max}/k_{f,g} + 1} - l_g(0)$$

whereby the belt force is limited to the maximum force, because the belt force is then determined with the new extension $$\varepsilon(k) = \frac{l_g(k)}{l_g(0) + l_{PO}}.$$

The belt force limiter can now in turn be designed such that only a specified amount of safety belt is paid out. In this way, an upper limit for $l_{PO}$ is then defined. As the expansion becomes greater, the belt force can increase to values greater than $F_{max}$. In each case, it is important that an amount of safety belt is paid out by the belt force limiter but is not drawn in again. In this way, there results an effective energy consumption of the belt force limiter. This energy is taken from the occupant.

The airbag is described as a gas volume that is partially compressed by two plungers, shown as examples in FIG. 4. The two plungers have cross-sectional surfaces that correspond to the contact surfaces of the head and chest of the occupant on the airbag. In this way, restraining forces are introduced at the head and in the upper body region.

The gas volume inside the airbag is compressed adiabatically, i.e., without an exchange of heat with the surrounding environment, by the restraint and by the occupants impacting it. Besides the compression, the airbag also loses gas through an opening that is modeled as a hole in a flat surface. The flow of gas through such an opening is $$V_{out} = C_d A_{out} \sqrt{\frac{\Delta p}{\rho}}$$

with coefficient of discharge $C_d = 0.61$ for flat openings, opening surface $A_{out}$, pressure difference $\Delta p$ and density $\rho$ of the gas flowing out. The density is in particular a function of the temperature of the gas. Under the assumption that the volume remains constant and that the pressure in the interior decreases due to the outflow, the reduction in pressure can be calculated according to $$p_{out} = V_{out} \cdot \frac{p}{V}.$$

This assumption holds in particular only for small outflow volumes, for example given time steps selected to be adequately small.

Besides the gas loss, the conditions in the interior of the airbag change due to the compression exerted by the impacting occupants. Here, the volume is $$V(k) = V(l) - A_{k'}(x_h - x_{h,0}) - A_{k'}(x_t - x_{t,0})$$

with contact surfaces $A_h$ and $A_k$ of the head and upper body. The respective terms that reduce the volume are active only when the expressions in parentheses are greater than zero; that is, when the contact between the head and the airbag or between the upper body and the airbag has been produced.

In this case, the restraining forces result as $$F_{k,h} = p \cdot A_k$$

and $$F_{t,b} = p \cdot A_t$$

and the torque thus results as $$M_{t,b} = F_{t,b} \cdot l_t.$$

In order to obtain a more realistic transition from the non-restrained to the restrained state, according to an exemplary embodiment the contact surface is made variable in order to achieve a smooth transition. If the force on a sphere that falls into an air cushion is considered, then the relevant cross-sectional surface is that surface that intersects the sphere with an orientation normal to the direction of force. The size of this surface results as $$A_V = A_{max} \cdot \left[1 - \left(1 - \frac{d}{r}\right)^2\right]$$

for sink-in depth d in the range $0 \le d \le r$.

Due to the adiabatic compression, the pressure in the airbag varies according to $$p(k) = p(k-1) \cdot \left[\frac{V(k-1)}{V(k)}\right]^\kappa$$

with the adiabatic coefficient $\kappa = 1.4$ for air.

In this way, all forces acting on the occupant within the model are known, and the simulation can be continued in the next time step.

A mass flow into the airbag can be modeled by an inflow of gas with the time-dependent gas flow rate:

$$\dot{n}_{in} = n_1 \cdot \frac{t}{\tau} \cdot \exp(-t/\tau).$$

To a good approximation, this corresponds to the actual gas flow rate of a gas generator as is used in airbags.

Figure 6:
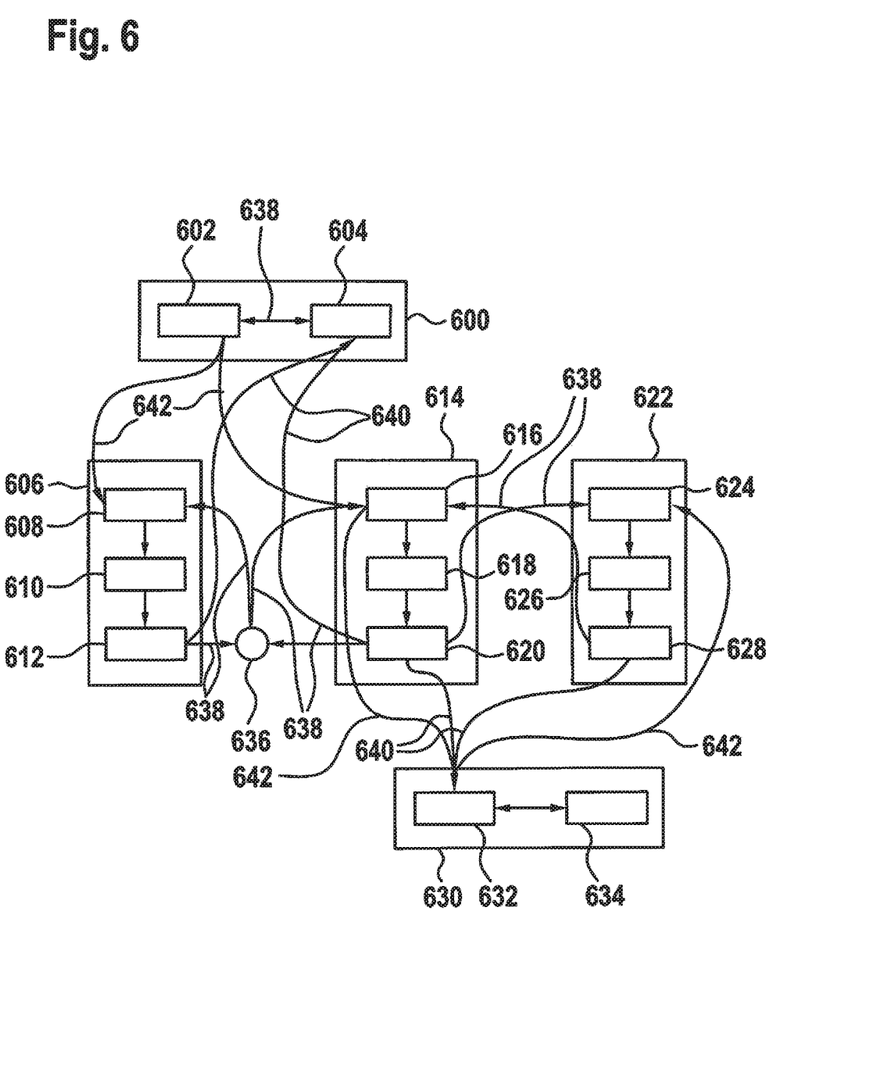
FIG. 6 is a flowchart of calculations in the context of an occupant model for the ascertaining of an occupant motion by a control device according to an example embodiment of the present invention.

FIG. 6 shows a flow diagram of calculations in the context of an occupant model for an ascertaining of an occupant movement by a control device according to an exemplary embodiment, for example a control device described above on the basis of FIGS. 2 through 5. Shown is a block 600 representing the airbag, with a block 602 for the pressure and a block 604 for the volume, a block 606 representing the head, with a block 608 for a restraining force acting on the head, a block 610 for the speed of the head, and a block 612 for the position of the head, a block 614 representing the upper body, with a block 616 for a restraining force acting on the upper body, a block 618 for a speed of the upper body, and a block 620 for a position of the upper body, a block 622 representing the pelvis with a block 624 for a restraining force acting on the pelvis, a block 626 for a speed of the pelvis, and a block 628 for a position of the pelvis, as well as a block 630 representing the belt, with a block 632 for an extension of the belt and a block 634 for the paying out of the belt by the belt force limiter. The distance between the head and the upper body is represented by a block 636.

Internal relationships are marked by arrows having reference characters 638. Actions of force of the occupant on the restraint system, also referred to above as the occupant protection system, are marked with arrows having reference characters 640. Effects of force of the restraint system on the occupants are marked with arrows having reference characters 642.

Figure 7:
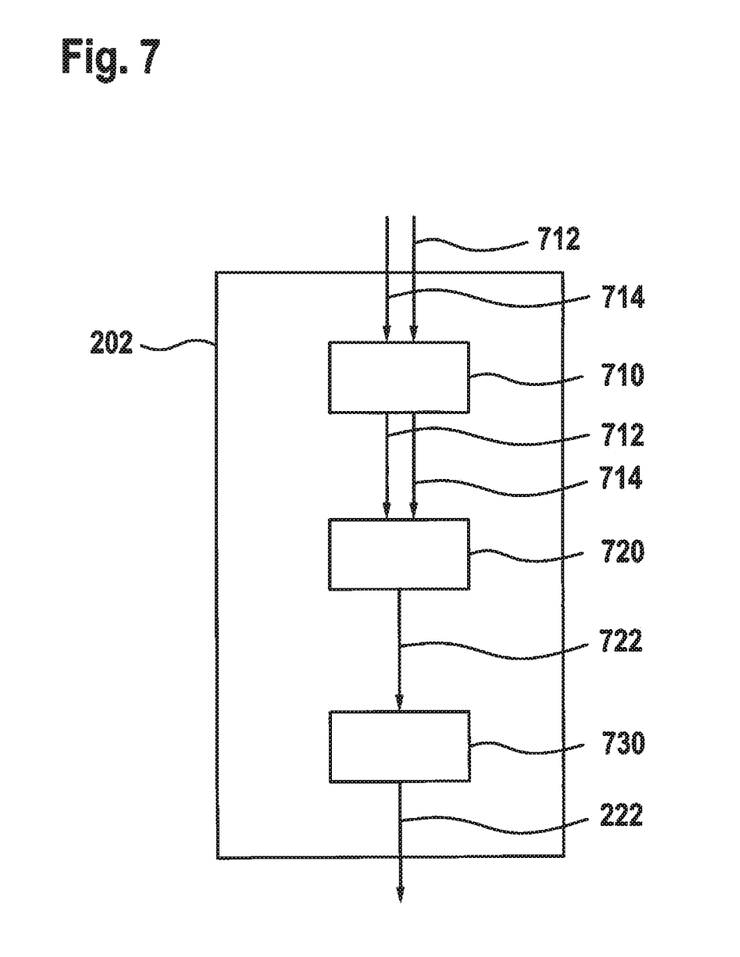
FIG. 7 shows a schematic representation of a control device according to an example embodiment of the present invention.

FIG. 7 shows a schematic representation of a control device 202 according to an exemplary embodiment, for example a control device described above on the basis of FIGS. 2 through 6. Control device 202 includes a read-in unit 710 for reading in a vehicle acceleration value 712 representing the acceleration of the vehicle, and at least one model parameter 714 of the occupant model representing the occupant of the vehicle through at least two, in particular three, mass points. A processing unit 720 is fashioned to determine at least one motion parameter 722 relating to the two, in particular three, mass points, using vehicle acceleration value 712 and model parameter 714, the motion parameter being for example an acceleration, a speed, or a path of the two, in particular three, mass points. A producing unit 730 is fashioned to produce control signal 222 for controlling the occupant protection system of the vehicle, using the motion parameter 722.

Figure 8:
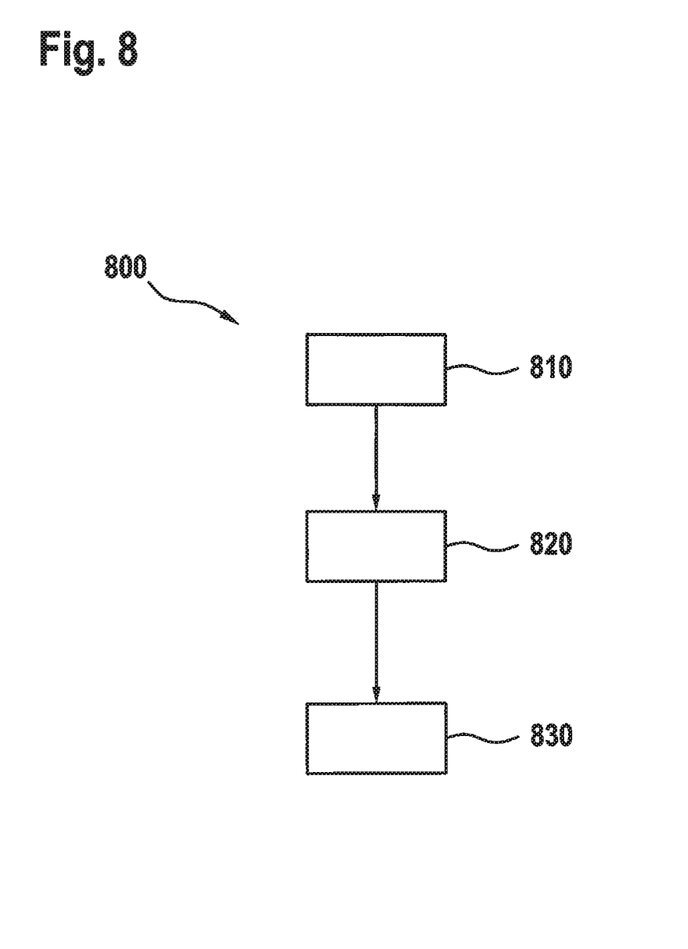
FIG. 8 is a flowchart that illustrates a method according to an example embodiment of the present invention.

FIG. 8 shows a flow diagram of a method 800 according to an exemplary embodiment. Method 800 can for example be carried out in connection with a control device described above on the basis of FIG. 7. Here, in a step 810 the vehicle acceleration value and the model parameter are read in. In a step 820, the vehicle acceleration value and the model parameter are processed in order to determine the motion parameter. Finally, in a step 830, using the motion parameter the control signal for controlling the occupant protection system is produced.

According to an exemplary embodiment, method 800 for determining an occupant kinematics includes a step of providing model parameters of the occupant protection system, a step of acquiring a deceleration, a surrounding environment, and an interior space of the vehicle, and a step of determining the movement trajectory of the occupant, according to a determination rule, from the model parameters and from the acquired parameters.

According to a further exemplary embodiment, method 800 includes a step of sensing an accident by ascertaining an environmental characteristic using an environmental sensor system of the vehicle. Here, for example the environmental sensor system recognizes that an accident is immediately impending and is unavoidable, whereupon, already before the contact of the vehicle with the respective collision object, in step 830 the control signal is produced in order to trigger reversible or irreversible restraint component of the occupant protection system. On the basis of the data ascertained by the environmental sensor system concerning the type of accident or severity of the accident, in combination with data from the interior compartment sensor system, an optimal triggering strategy can then be determined.

If an exemplary embodiment includes an "and/or" linkage between a first feature and a second feature, this is to be read as meaning that according to a specific embodiment the exemplary embodiment has both the first feature and the second feature, and according to another specific embodiment the exemplary embodiment has either only the first feature or only the second feature.

What is claimed is:

1. A method for controlling an occupant protection system of a vehicle, the method comprising:
    reading in, by a processing unit, (a) a vehicle acceleration value representing an acceleration of the vehicle and (b) a model parameter of an occupant model, the occupant model representing an occupant of the vehicle by at least two mass points, wherein the occupant model is a spring-mass-damper model representing motion of the occupant in a crash of the vehicle, and wherein the at least two mass points include a head mass point representing a head and/or a neck of the occupant and an upper body mass point representing an upper body of the occupant, the occupant model connecting the head mass point to the upper body mass point by a spring element;
    determining, by the processing unit, at least one motion parameter relating to the mass points using the occupant model, the vehicle acceleration value, and the model parameter; and
    producing, by the processing unit, a control signal for controlling the occupant protection system using the motion parameter.

2. The method of claim 1, further comprising determining, based on at least one of the vehicle acceleration value and the model parameter, at least one restraining force acting on the occupant, wherein the determination of the motion parameter is based on the determined restraining force.

3. The method of claim 2, wherein the at least one restraining force relates to at least one of the mass points.

4. The method of claim 2, wherein the at least one restraining force includes at least one of (a) a force exerted by at least one of a belt of the vehicle, a seat of the vehicle, and an airbag of the vehicle, and (b) a neck force of the occupant.

5. The method of claim 2, further comprising comparing the restraining force to a reference force, wherein the production of the control signal is as a function of a result of the comparison.

6. The method of claim 5, wherein the production of the control signal is in response to the result of the comparison being that the restraining force is greater than the reference force, and the production of the control signal causes a length of the belt to be increased by unrolling the belt.

7. The method of claim 1, further comprising reading in at least one of an item of environmental information representing a surrounding environment of the vehicle and an item of interior compartment information representing an interior compartment of the vehicle, the determination of the motion parameter is further based on the at least one of the item of environmental information and the item of interior compartment information.

8. The method of claim 1, wherein the at least two mass points includes three mass points.

9. The method of claim 1, wherein the spring element connecting the head mass point to the upper body mass point is a rotational spring.

10. The method of claim 1, wherein the occupant model further includes a lower body mass point representing a lower body of the occupant, and wherein in the occupant model, a connection between the lower body mass point the upper body being fixed in length by capable of rotation.

11. A system comprising: an input; and processing circuitry interfacing with a vehicle occupant protection system, wherein the processing circuitry is configured to: read in, via the input, (a) a vehicle acceleration value representing an acceleration of the vehicle and (b) a model parameter of an occupant model, the occupant model representing an occupant of the vehicle by at least two mass points, wherein the occupant model is a spring-mass-damper model representing motion of the occupant in a crash of the vehicle, and wherein the at least two mass points include a head mass point representing a head and/or a neck of the occupant and an upper body mass point representing an upper body of the occupant, the occupant model connecting the head mass point to the upper body mass point by a spring element; determine at least one motion parameter relating to the mass points using the occupant mode, the vehicle acceleration value, and the model parameter; and provide to the vehicle occupant protection system a control signal for controlling, the occupant protection system using the motion parameter.

12. A non-transitory computer-readable medium on which are stored instructions that are executable by a processor and that, when executed by the processor, cause the processor to perform a method for controlling an occupant protection system of a vehicle, the method comprising: reading in (a) a vehicle acceleration value representing an acceleration of the vehicle and (b) a model parameter of an occupant model, the occupant model re senting an occupant of the vehicle by at least two mass points, wherein the occupant model is a spring-mass-damper model representing motion of the occupant in a crash of the vehicle, and wherein the at least two mass points include a head mass point representing a head and/or a neck of the occupant and an upper body mass point representing an upper body of the occupant, the occupant model connecting the head mass point to the upper body mass point by a spring element; determining at least one motion parameter relating to the mass points using the occupant model, the vehicle acceleration value and the model parameter; and producing a control signal for controlling the occupant protection system using the motion parameter.

13. The system of claim 11, wherein the spring element connecting the head mass point to the upper body mass point is a rotational spring.

14. The system of claim 11, wherein the occupant model further includes a lower body mass point representing a lower body of the occupant, and wherein in the occupant model, a connection between the lower body mass point the upper body being fixed in length by capable of rotation.

* * * * *